United States Patent

Bauer et al.

[11] 3,895,824
[45] July 22, 1975

[54] PASSIVE ACTUATING DEVICE FOR A SAFETY BELT

[75] Inventors: Andrfas Bauer; Erwin Blüggel, both of Fallersleben, Germany

[73] Assignee: Volkswagenwerk Aktiengesellschaft, DT

[22] Filed: Feb. 13, 1974

[21] Appl. No.: 442,076

[30] Foreign Application Priority Data

Feb. 23, 1973  Germany............................ 2308980

[52] U.S. Cl............ 280/150 SB; 297/388; 297/389
[51] Int. Cl. ........................................... B60r 21/02
[58] Field of Search ............. 280/150 SB; 180/82 C; 297/385, 388, 389

[56] References Cited
UNITED STATES PATENTS

| | | | |
|---|---|---|---|
| 3,583,726 | 6/1971 | Lindblad ....................... | 280/150 SB |
| 3,770,078 | 11/1973 | Keppel et al. .............. | 280/150 SB X |
| 3,781,034 | 12/1973 | Botnick et al................. | 280/150 SB |

*Primary Examiner*—Philip Goodman
*Assistant Examiner*—Michael J. Forman
*Attorney, Agent, or Firm*—Brumbaugh, Graves, Donohue & Raymond

[57] ABSTRACT

A passive actuating device for a safety belt associated with a vehicle seat comprises a lever pivotally mounted in a door of the vehicle. The lever is coupled to the vehicle body by a stop that limits the outward opening movement of the door. The lever includes two interconnected arms oriented at an angle to each other with one arm coupled to a portion of the safety belt. The other arm is coupled to the door stop so that upon opening of the door, the one arm is pivoted into a first position and the portion of the safety belt is raised relative to the associated vehicle seat. Upon closing of the vehicle door, the arm coupled to the safety belt is pivoted into a second position and the portion of the safety belt is lowered relative to the associated vehicle seat.

8 Claims, 9 Drawing Figures

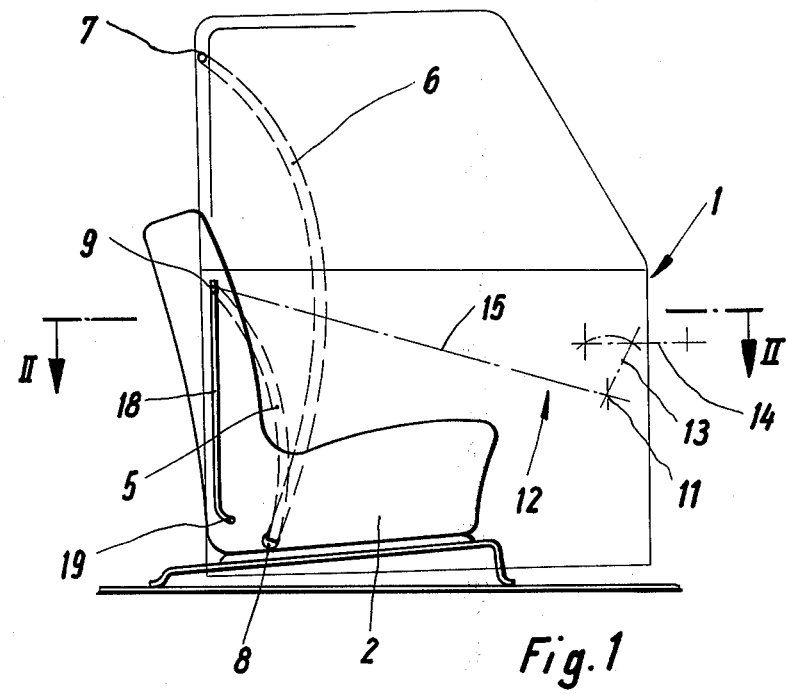
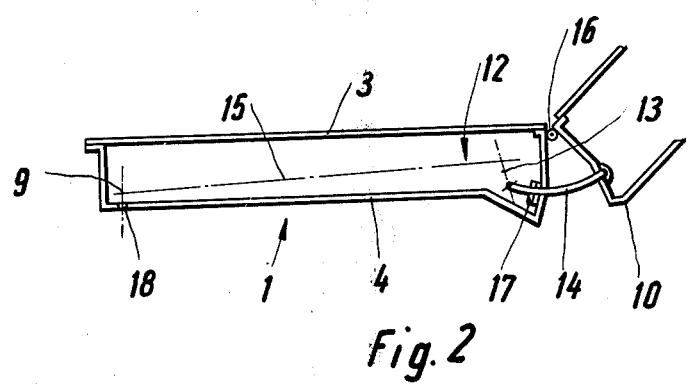

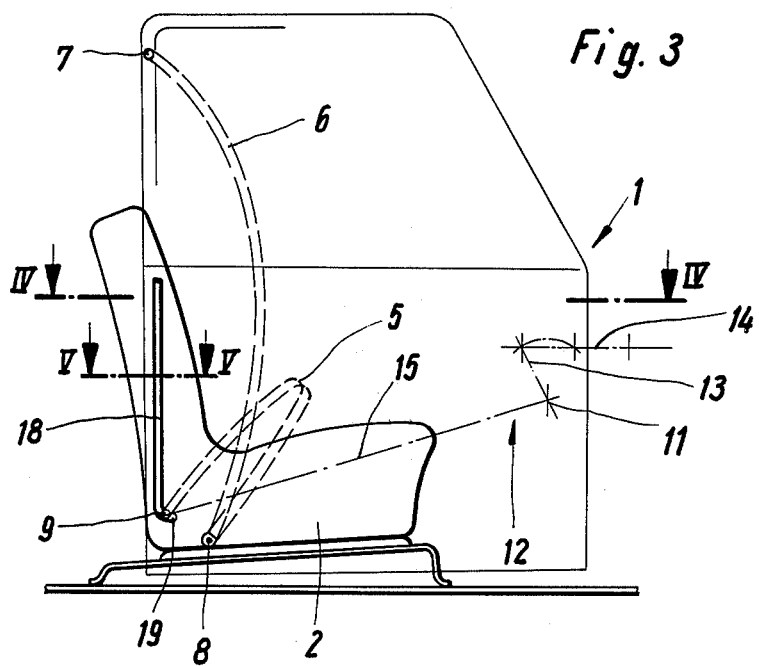
Fig. 3
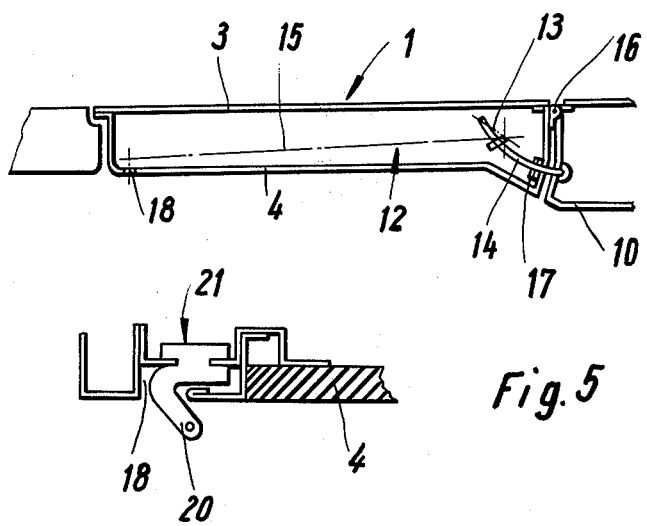
Fig. 4
Fig. 5

PASSIVE ACTUATING DEVICE FOR A SAFETY BELT

BACKGROUND OF THE INVENTION

The most widely used device for protecting a passenger in a vehicle, such as an automobile, from being thrown against parts of the vehicle interior in the event of an accident is a safety belt that straps the passenger firmly to his seat. To be effective, the safety belt must be properly adjusted and fastened around a passenger sitting in the associated seat. The typical automobile safety belt, therefore, is provided with an adjustably positioned, releasable buckle so that the passenger may fasten and adjust the belt about his body after he is seated. Nonetheless, many people regard having to fasten and adjust a safety belt as an annoying inconvenience, and thus the effectiveness of a safety belt is often wasted because passengers do not use it.

To eliminate the inconvenience of having to fasten a safety belt, one end of the belt is sometimes mounted on an adjacent automobile floor. When the door is opened, the safety belt swings away from its associated seat to allow a passenger to enter or leave the automobile without handling the belt. When the door is closed, the safety belt swings into position about its associated seat and the body of a passenger who may be seated in the seat. The additional length of safety belt necessary for such a safety belt arrangement is taken up on an automatic winding spool when the door is closed. The automatic take-up also insures a close engagement of the belt with the passenger's body. A locking mechanism on the spool prevents the belt from unwinding when an impact load is applied to the belt as a result of a collision.

One arrangement for mounting an end of safety belt on an adjacent vehicle door is shown and described in German Offenlegungsschrift No. 1 918 427 and in corresponding British Pat. No. 1,215,424. In the patented arrangement, a lever is pivotally mounted in a door of a vehicle and has two arms oriented at an angle to each other. One arm of the lever is coupled to a portion of a combination lap and shoulder safety belt intermediate its ends. The other lever arm is connected to a flexible strip fixed at one end to the door frame. When the door is opened, the strip flexes about a vertical axis and the relative movement between the door and the strip causes the lever to pivot in the door. As the lever is pivoted, the lever arm coupled to the safety belt is raised relative to the associated vehicle seat, carrying the safety belt with it and allowing a passenger to enter or leave the automobile without handling the belt. When the door is closed, the two-armed lever is pivoted so that the end of the safety belt is moved into a restraining position about the associated seat.

SUMMARY OF THE INVENTION

The present invention is directed to a passive actuating device for a safety belt associated with a seat in a vehicle, such as an automobile. The actuating device comprises a lever pivotally mounted in a door of the vehicle and coupled to the vehicle body by a stop that limits outward opening movement of the door. The lever includes two interconnected arms oriented at an angle to each other. One arm of the lever is coupled to a portion of the safety belt and the second lever arm is coupled to the door stop. Upon opening of the door, the relative movement between the door and the stop causes the first lever arm to be pivoted into a first position and the portion of the safety belt to be raised relative to the associated vehicle seat. Upon closing of the vehicle door, the arm coupled to the safety belt is pivoted into a second position and the portion of the safety belt is lowered relative to the associated vehicle seat.

The door stop of the actuating device has a configuration that curves in the direction in which the door opens. To accommodate the curvature of the stop, the lever arm coupled to the stop, in one embodiment of the invention, is pivotable about the longitudinal axis of the lever arm coupled to the safety belt. In another embodiment, the actuating device includes an intermediate lever coupling the door stop to the adjacent lever arm. The intermediate lever is pivotally coupled both to the door stop and to the lever arm.

The safety belt is coupled to the first lever arm by a coupling that passes through a guide slot formed in an interior wall of the vehicle door. The slot is generally vertically oriented in the interior door wall and is located adjacent a generally vertical edge of the door spaced from the door stop. Because the slot is generaly straight, the lever arm includes at least two parts coupled together for longitudinal movement relative to each other. As the lever arm is pivoted, therefore, its length adjusts so that the coupling on the arm can slide freely along the slot. A portion of the slot at its lower end is inclined away from the door edge to permit the lever arm to be locked in its second or lower position.

The coupling joining the lever to the safety belt may also include a sleeve and a spring biasing the sleeve away from the lever. A pocket is formed adjacent the lower end of the slot in the interior door wall and portions of the pocket and of the coupling sleeve have similar generally spherical surfaces curving interiorly of the vehicle. As a result, the spherical portion of the sleeve can be fitted into the pocket against the biasing action of the spring to lock the lever arm coupled to the safety belt in its second or lower position.

As can be seen from the above description, the present invention, while in some respects resembling the apparatus of German Offenlegungsschrift No. 1 918 427, accomplishes its objective with fewer components and in a safer and more aesthetically pleasing manner. Specifically, the actuating device of the present invention utilizes a conventional door stop, rather than a specially designed flexible strip, thereby reducing the number of components used in the device and making the device less conspicuous. The vertically extending guide slot of the invention is also safer and less conspicuous than the inclined guide slot of the German patent, since the vertical slot is generally located to the rear of an associated vehicle seat and is essentially covered by the seat.

The passive actuating device of the present invention may be utilized with either a two-point safety belt (i.e. a diagonal shoulder belt or a lap belt) or a three-point safety belt (i.e. a combination lap and diagonal shoulder belt). If a three-point safety belt is utilized, the safety belt may be arranged so that either one or two mounting points for the belt are on the vehicle door and, correspondingly, either two or one mounting point is arranged between the front seats of the vehicle. for example.

BRIEF DESCRIPTION OF THE DRAWINGS

For a better understanding of the invention, reference may be made to the following description of an exemplary embodiment, taken in conjunction with the figures of the accompanying drawings, in which:

FIG. 1 is a side view of an open door for an automobile equipped with a passive actuating device for a safety belt according to the present invention;

FIG. 2 is a sectional view of the door of FIG. 1, taken along view line II—II of FIG. 1;

FIG. 3 is a side view of the automobile door of FIG. 1, taken when the door is closed;

FIG. 4 is a sectional view of the door of FIG. 3, taken along view line IV—IV of FIG. 3;

FIG. 5 is a sectional view taken along view line V—V of FIG. 3;

DESCRIPTION OF AN EMBODIMENT

Figure 6:
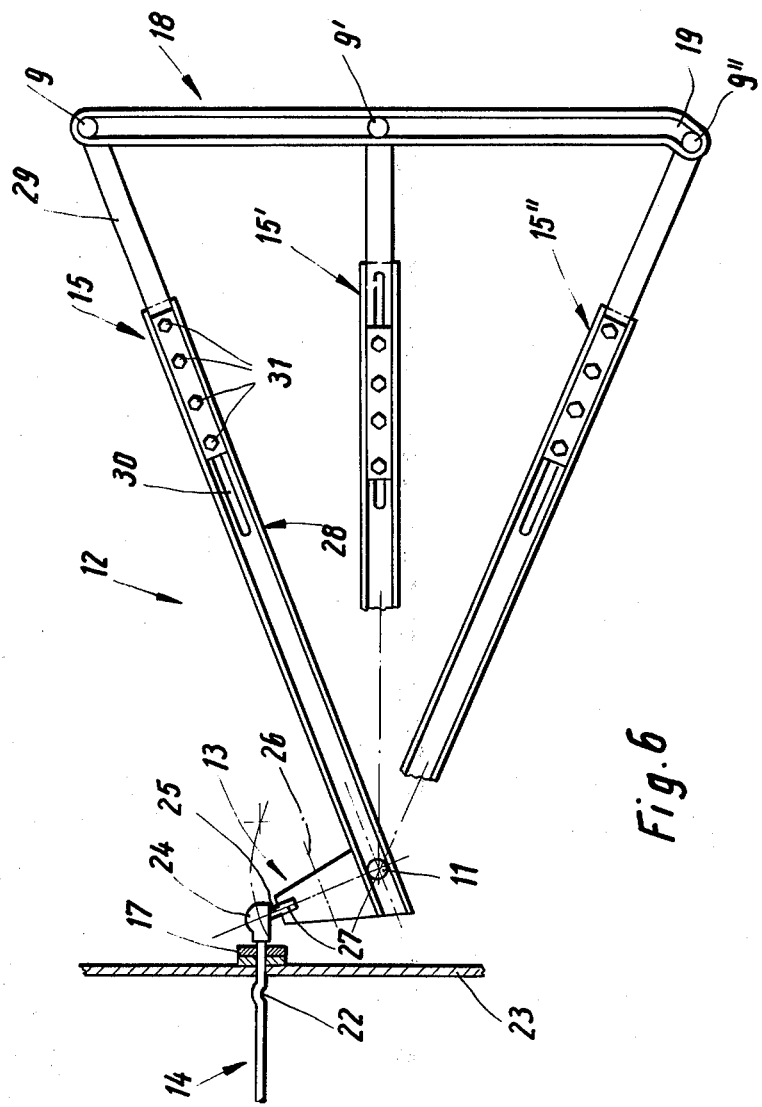
FIG. 6 is a side view of components of the passive actuating device illustrated schematically in FIGS. 1–4.

FIGS. 1–5 of the application present different views of the left front door 1 of an automobile and the adjacent left front (driver's) automobile seat 2. Associated with the seat 2 is a three-point safety belt that includes a lap belt 5 and a shoulder belt 6. The lap and shoulder belts 5 and 6 are coupled together at their right ends (viewed as though sitting in the seat 2) and are also attached at their right ends by a mounting bracket 8 to the frame of the seat 2. While not shown, another conventional method of attachment would be to mount the right ends of the belts 5 and 6 on the hump or tunnel in the automobile floor through which extends the drive shaft for the automobile. The left end of the lap belt 5 is mounted on the lower rear portion of the door 1 by a coupling 9, as will be described hereinafter, while the left end of the shoulder belt 6 is pivotally connected to the upper rear corner of the door by a mounting bracket 7. Automatic winding or take-up spools may be mounted adjacent any of the brackets or couplings 7, 8 and 9 to wind up automatically any excess length of the safety belts 5 and 6 which is not in use.

As shown in FIG. 2, the automobile door 1 includes spaced apart exterior and interior walls 3 and 4 and is mounted in a door frame 10 by a conventional hinge 16. The door 1 is also connected to the door frame 10 by a conventional door stop 14. The stop 14 is fabricated of a curved metal band and is mounted so as to curve about the hinge 16 in the direction in which the door opens. The door frame 10 and the door stop 14 do not move relative to each other, but the stop is slidably received in an opening formed in the adjacent vertical edge of the door 1. Element 17 of FIG. 2, which is located inside the door 1 immediately adjacent the opening for the stop 14, is a conventional door component that cooperates with the door stop.

As illustrated schematically in FIGS. 1–4, a lever 12 is pivotally mounted on the door 11, between its inner and outer walls 4 and 3. The lever 12 has two arms 13 and 15 that are oriented at an angle to each other and are joined together at the point 11 where the lever is mounted on the door 1. The arm 13 of the lever 12 is considerably shorter than the arm 15 and has a generally vertical orientation, while the arm 15 is oriented generally horizontally and extends longitudinally of the automobile door 1. The free end of the arm 13 is coupled to the end of the door stop 14 which is received in the door 1. The free end of the lever arm 15 is connected by the coupling 9 to the left end of the lap belt 5.

The coupling 9 on the free end of the lever arm 15 travels in a generally vertical guide slot 18 formed in the interior wall 4 of the door 1 adjacent the rear vertical edge of the door. As shown in FIG. 5, the coupling 9 includes a slide portion 21 to which the lever arm 15 is attached. An arm portion 20 projects from the slide portion 21 for attachment to the lap belt 5. The fastening of the lever arm 15 to the slide portion 21 and of the safety belt 5 to the arm portion 20 may be done in any conventional manner and is not illustrated for simplicity.

At the lower end of the guide slot 18, a portion 19 of the slot is inclined or bent away from the rear edge of the door 1 towards the front of the automobile. The bent-off portion 19 of the slot 18 tends to hold the coupling 9 against upward movement and thus maintains the lap belt 5 in its proper restraining position about the body of a passenger seated in the seat 2. In the event of a head-on collision, in particular, the impact force exerted on the lap belt 5, resulting from the sudden deceleration of an occupant of the seat 2, will tend to pull the coupling 9 further into the bent-off portion 19 of the slot 18 to further lock the coupling and the lap belt in position.

In operation, opening or closing of the door 1 results in relative movement between the door stop 14 and the door. Since the stop 14 is coupled to the lever arm 13, the relative movement between the stop and the door 1 produces rotational movement of the lever arm 13 about an axis passing through the pivot point 11. Pivoting of the lever arm 13 also pivots the lever arm 15 so that its free end moves in a generally vertical direction and raises or lowers the left end of the lap belt 5 relative to the seat 2. Thus, when the door 1 is closed, the left end of the lap belt 5 is lowered into a restraining position about the seat 2 as shown in FIG. 3. When the door 1 is opened, the left end of the lap belt 5 is raised to faciitate entry into or exit from the automobile as shown in FIG. 1.

Because the door stop 14 is curved about a vertical axis, relative movement between the stop and the door 1 will tend to move the free end of the lever arm 13 both longitudinally of the door and laterally of the door. If the lateral movement of the lever arm 13 were transmitted to the lever arm 15, the lever arm 15 would bind against the walls of the door 1. To avoid such a problem, the connection between the lever arms 13 and 15 is made such that the lever arm 13 can rotate about the longitudinal axis of the lever arm 15 independently of the lever arm 15.

In addition, since the lever arm 15 pivots about one end, the position of the coupling 9 relative to the fixed end of the arm must be adjustable in order to accommodate movement of the coupling in the generally straight and vertically oriented guide slot 18. Accordingly, the lever arm 15 may be constructed in two or more parts that slide longitudinally relative to each other, as will be described hereinafter, or, as an alternative, the free end of the lever arm may be slotted so that the coupling 9 can move along the arm 15. If the coupling 9 is movable along the lever arm 15, however, the guide slot 18 must be spaced at a relatively greater distance from the rear edge of the door 1 in order to provide the necessary clearance for the free end of the lever arm.

FIG. 6 of the drawings illustrates a particular construction for the lever 12 of the passive actuating device of the present invention. Looking first at the left hand side of FIG. 6, the door stop 14 is shown with a bent portion 22 that counters closing of the door 1, when the door is fully opened. At the right end of the door stop 14, as viewed in FIG. 6, a socket is rigidly connected to the door stop and receives a ball connected to one end of a relatively short intermediate lever 25. The other end of the intermediate lever 25 is received in a slot 27 formed in the free end of the lever arm 13. The slot 27 extends crosswise of the lever arm 13 (i.e. laterally of the door 1) so that relative movement of the end of the door stop 14 longitudinally of the door 1 is transmitted to the lever arm 13, while movement of the door stop end laterally or crosswise of the door is expended in movement of the intermediate lever 25 across the slot 127. As a result, the two arms 13 and 15 of the lever 12 can be rigidly joined together and mounted to pivot about a pin, for example, at the pivot point 11.

In FIG. 6, the lever arm 15 is composed at two rails 28 and 29. The rails 28 and 29 are longitudinally overlapped and are connected by bolts 31 passing through an elongated slot 30 in the rail 28. The slot 30 permits the rails 28 and 29 to move relative to each other and permits the coupling 9 on the free end of the lever arm 15 to move along the guide slot 18, as shown, for example, by the alternate positions 15' and 15'' of the lever arm and the alternate positions 9' and 9'' of the coupling.

Figure 7:
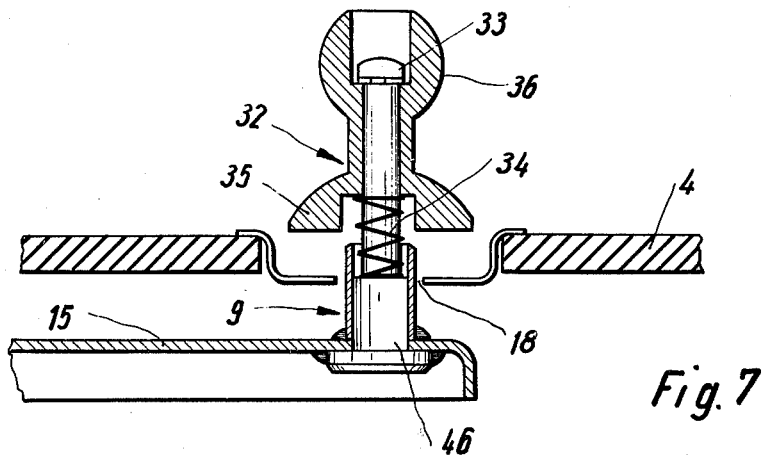
FIG. 7 is a sectional view taken generally along view line V—V of FIG. 3, showing an alternate embodiment of the coupling illustrated in FIG. 5.
Figures 8, 9:
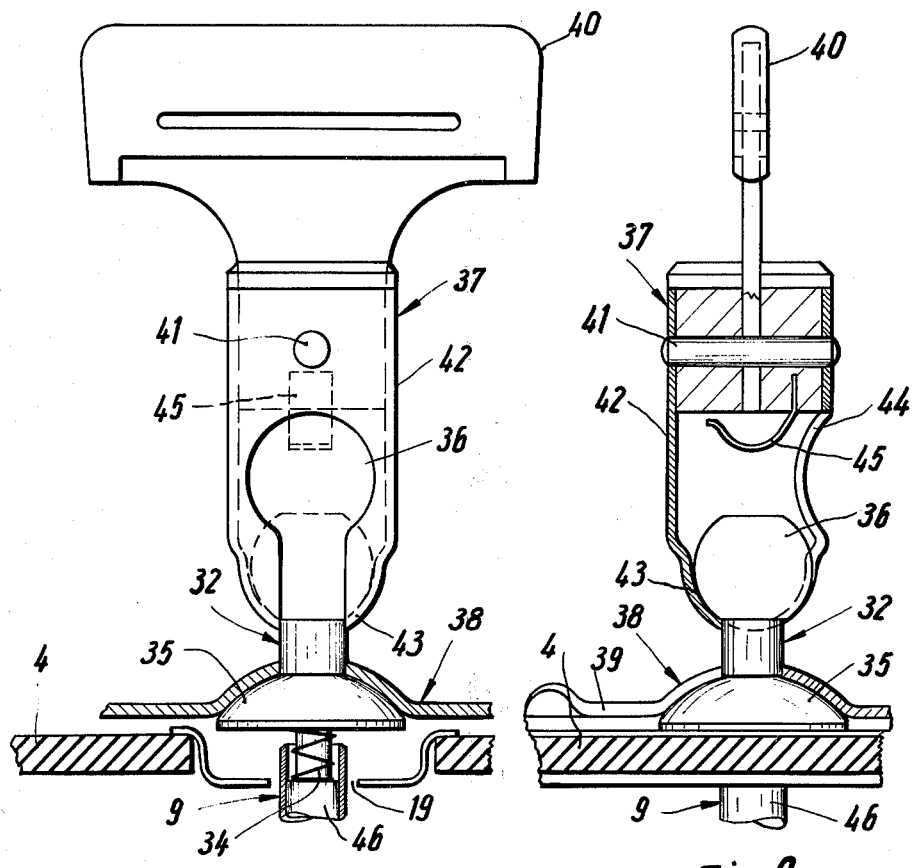
FIG. 8 is a side view of the coupling of FIG. 7, when in a different position than illustrated in FIG. 7.
FIG. 9 is a view of the coupling of FIG. 8, turned 90° relative to FIG. 8.

FIGS. 7–9 illustrate a second embodiment of the coupling 9 joining the lap belt 5 to the free end of the lever arm 15. In the embodiment, the coupling 9 includes a pin 46 extending from the lever arm 15 and passing through the guide slot 18 in the interior wall 4 of the door 1. The end of the pin 46 away from the lever arm 15 has a radially extending flange 33 that holds a tubular sleeve 32 on the pin. The end 35 of the sleeve 32 adjacent the lever arm 15 has a generally spherical surface that curves toward the interior of the automobile, while the other end 36 of the sleeve is ball shaped. A spring 34 encircles the pin 46 intermediate the ends of the pin and biases the sleeve 32 toward the flange 33 on the pin.

FIGS. 8 and 9 illustrate the coupling 9 when the lever arm 15 is in its lowest or restraining position and the coupling is in the bent-off portion 19 of the guide slot 18. A pocket-like element 38 is fastened on the interior wall 4 of the door 1 so that a slot 39 formed in the element 38 is aligned with the guide slot 18. The central portion of the element 38, adjacent the end of the slot 39, is concavely configured so that the end 35 of the sleeve 32 fits into the central portion of the pocket element. In operation, as the coupling 9 moves into the bent-off slot portion 19, the sleeve end 35 is caught under the leading edge of the pocket element 38 and is pressed toward the lever arm 15. When the sleeve 32 reaches the concave central portion of the pocket element 38, the spring 34 forces the sleeve end 35 upwardly into the concave central portion to lock the coupling 9 in place. The pocket element 38 thus enchances the operation of the bent-off portion 19 of the guide slot 18.

The lap belt 5 is secured to the sleeve 32 by a coupling link, generally designated 37, which snaps over the interior end 36 of the sleeve 32. The coupling link 37 includes a slotted bracket member 40 and a clip member 42, which are joined together by a pin 41. The clip member 42 is generally hollow and has an opening 44 in one side configured to match the profile of the interior end 36 of the sleeve 32. The sleeve end 36 can thus be inserted into the clip member 42 through the opening 44. A curved leaf spring 45, is mounted inside the clip member 42 adjacent the opening 44 so as to urge the sleeve end 36 downwardly into the spherically shaped end 43 of the clip member. In FIG. 8, the initial position of the sleeve 32, while being inserted into the clip member 42, is illustrated in full, while the final position of the sleeve is illustrated in broken lines.

The other end of the hollow clip 42 receives an end of the slotted bracket member 40 in which a hole is formed. The hole in the bracket member 40 aligns with corresponding holes in the hollow clip member 42 and the pin 41 is inserted through the aligned holes to hold the two members together. The safety belt 5 (not shown in FIGS. 8 and 9) is threaded through a slot in the other end of the bracket member.

It will be understood that the above described embodiments are merely exemplary and that those skilled in the art may make many variations and modifications without departing from the spirit and scope of the invention. All such modifications and variations are intended to be within the scope of the invention as defined in the appended claims.

We claim:

1. A passive actuating device for a safety belt associated with a seat in a vehicle comprising (a) lever means pivotally mounted in a door of the vehicle and including two interconnected arms oriented at an angle to each other, (b) means defining in an interior wall of the door a slot that has a lower end and an upper end located higher on the door than the lower end, (c) means passing through the slot for coupling one arm of the lever means to a portion of the safety belt and (d) stop means for limiting outward opening movement of the door and for yieldingly resisting inward closing movement of the door from at least one open position, the stop means coupling the other arm of the lever means to the vehicle body, the one arm of the lever means being coupled to the safety belt and the other arm being coupled to the stop means so that, upon opening of the door, the one arm is pivoted into a first position and the portion of the safety belt is raised relative to the associated vehicle seat and, upon closing of the door, the one arm is pivoted into a second position and the portion of the safety belt is lowered relative to the associated vehicle seat.

2. A passive actuating device according to claim 1, wherein the stop means has a configuration that is curved in a direction in which the door opens and wherein the other arm is pivotable about the longitudinal axis of the one arm.

3. A passive actuating device according to claim 1, wherein the stop means has a configuration that is curved in a direction in which the door opens and wherein the actuating device further comprises an intermediate lever coupling the stop means to the other arm of the lever means, the intermediate lever being pivotally coupled to the stop means and pivotally coupled to the other arm of the lever means.

4. A passive actuating device according to claim 1, wherein the slot is generally vertically oriented in the interior door wall adjacent a generally vertical edge of the door spaced from the stop means.

5. A passive actuating device according to claim 4, wherein the one arm of the lever means includes at least two parts coupled together for longitudinal movement relative to each other upon pivoting of the one arm.

6. A passive actuating device according to claim 4, wherein a portion of the slot at its lower end is inclined away from the door edge for locking the one arm of the lever means in its second position.

7. A passive actuating device according to claim 4, further comprising means defining a pocket adjacent the lower end of the slot and wherein the coupling means includes a sleeve and a spring biasing the sleeve away from the one arm of the lever means, a portion of the sleeve and a portion of the pocket having generally spherical surfaces curving interiorly of the vehicle, the portion of the sleeve being adapted to fit into the pocket against the biasing of the spring, thereby to lock the one arm in its second position.

8. A passive actuating device according to claim 7, wherein the portion of the sleeve is located at an end of the sleeve adjacent the one arm and wherein the other end of the sleeve is configured for detachably engaging a coupling link for the safety belt.

* * * * *